United States Patent
Park et al.

(10) Patent No.: US 9,496,548 B2
(45) Date of Patent: Nov. 15, 2016

(54) NEGATIVE ACTIVE MATERIAL FOR RECHARGEABLE LITHIUM BATTERY, METHOD FOR PREPARING SAME, AND RECHARGEABLE LITHIUM BATTERY INCLUDING SAME

(71) Applicant: Samsung SDI Co., Ltd., Yongin-si, Gyeonggi-Do (KR)

(72) Inventors: Sung Soo Park, Yongin-si (KR); Sang-Hun Lee, Yongin-si (KR); Jae-Hyun Shim, Yongin-si (KR); Jun-Kyu Cha, Yongin-si (KR); Ki-Jun Kim, Yongin-si (KR); Jae-Myung Kim, Yongin-si (KR); Su-Bin Song, Yongin-si (KR); Eun-Cheol Lee, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 207 days.

(21) Appl. No.: 14/149,625

(22) Filed: Jan. 7, 2014

(65) Prior Publication Data

US 2014/0342235 A1 Nov. 20, 2014

(30) Foreign Application Priority Data

May 15, 2013 (KR) .......................... 10-2013-0055054

(51) Int. Cl.
| | |
|---|---|
| *H01M 4/36* | (2006.01) |
| *H01M 4/139* | (2010.01) |
| *H01M 4/38* | (2006.01) |
| *H01M 4/587* | (2010.01) |
| *H01M 4/62* | (2006.01) |
| *H01M 4/04* | (2006.01) |

(52) U.S. Cl.
CPC ............ *H01M 4/366* (2013.01); *H01M 4/139* (2013.01); *H01M 4/362* (2013.01); *H01M 4/386* (2013.01); *H01M 4/587* (2013.01); *H01M 4/625* (2013.01); *H01M 4/0471* (2013.01); *Y02E 60/122* (2013.01)

(58) Field of Classification Search
CPC ..... H01M 4/366; H01M 4/139; H01M 4/362
See application file for complete search history.

(56) References Cited

U.S. PATENT DOCUMENTS

| | | | | |
|---|---|---|---|---|
| 2011/0200874 A1* | 8/2011 | Ono | ...................... | H01M 4/134 429/213 |
| 2012/0077087 A1* | 3/2012 | Cho | ...................... | H01M 4/133 429/219 |

FOREIGN PATENT DOCUMENTS

| | | |
|---|---|---|
| JP | 2004-220910 A | 8/2004 |
| JP | 2010-232077 A | 10/2010 |
| JP | 2011-018575 A | 1/2011 |
| KR | 10-2008-0111809 A | 12/2008 |
| KR | 10-1002539 B1 | 12/2010 |
| KR | 10-2011-0069037 | 6/2011 |

OTHER PUBLICATIONS

L. Ji, X. Zhang, "Fabrication of porous carbon/Si composite nanofibers as high-capacity battery electrodes," *Electrochemistry Communications* 11 (2009) 1146-1149.

\* cited by examiner

*Primary Examiner* — Robert Harlan
(74) *Attorney, Agent, or Firm* — Knobbe Martens Olson & Bear LLP

(57) ABSTRACT

Disclosed are a negative active material for a rechargeable lithium battery, a method of preparing the same, and a rechargeable lithium battery including the same. The negative active material includes a composite particle including a silicon particle and a carbon coating layer coated on the surface of the silicon particle and a porous space formed by the entangled carbon nanofibers, the composite particle contacting the external surface of the carbon nanofibers in the porous space of the carbon nanofiber structure, and the carbon nanofibers have a larger diameter than that of the composite particle and a diameter ranging from about 100 nm to about 2000 nm.

15 Claims, 8 Drawing Sheets

NEGATIVE ACTIVE MATERIAL FOR RECHARGEABLE LITHIUM BATTERY, METHOD FOR PREPARING SAME, AND RECHARGEABLE LITHIUM BATTERY INCLUDING SAME

INCORPORATION BY REFERENCE TO ANY PRIORITY APPLICATIONS

Any and all applications for which all foreign or domestic priority claim is identified in the Application Data Sheet as filed with the present application are hereby incorporated by reference under 37 CFR 1.57. For example, this application claims priority to and the benefit of Korean Patent Application No. 10-2013-0055054 filed in the Korean Intellectual Property Office on May 15, 2013, the disclosure of which is incorporated herein by reference in its entirety.

BACKGROUND

1. Field

This disclosure relates to a negative active material for a rechargeable lithium battery, a method of preparing the same, and a rechargeable lithium battery including the same.

2. Description of the Related Technology

Batteries generate electric power by using electrochemical reaction materials (referred to hereinafter simply as an "active material") for a positive electrode and a negative electrode. Rechargeable lithium batteries generate electrical energy from changes of chemical potential during the intercalation/deintercalation of lithium ions at the positive and negative electrodes.

Rechargeable lithium batteries use materials that reversibly intercalate or deintercalate lithium ions during charge and discharge reactions for both positive and negative active materials, and also contain an organic electrolyte or a polymer electrolyte between the positive electrode and the negative electrode.

Composite metal oxides have been used in positive active materials in rechargeable lithium batteries. Examples include composite metal oxides such as $LiCoO_2$, $LiMn_2O_4$, $LiNiO_2$, $LiNi_{1-x}Co_xO_2$ (0<x<1), $LiMnO_2$, and the like have been used.

For a negative active material of a rechargeable lithium battery, various carbon-based materials such as artificial graphite, natural graphite, and hard carbon, all of which can intercalate and deintercalate lithium ions, have been used. Among the carbon-based materials, graphite has a low discharge potential of about −0.2V relative to lithium. Thus, a battery using graphite as a negative active material has a high discharge potential ranging from about 3.6V and has excellent energy density. The graphite guarantees a long cycle life for a battery due to its outstanding reversibility. However, graphite negative active material has a low density of about 1.6 g/cc and consequently has a low capacity in terms of energy density per unit volume.

Therefore, high-capacity negative active materials that can replace graphite active material are desirable. The embodiments discussed herein address this problem and provide additional advantages as well.

The above information disclosed in this Background section is only for enhancement of understanding of the background of the disclosure, and therefore, it may contain information that does not form the prior art already know in this country to a person of ordinary skill in the art.

SUMMARY

Some embodiments provide a negative active material for a rechargeable lithium battery that exhibit high storage capacity and thus, excellent initial efficiency and cycle-life characteristics of the instant rechargeable lithium battery.

Another embodiment provides a method of preparing the negative active material for a rechargeable lithium battery.

Yet another embodiment provides a rechargeable lithium battery including the negative electrode.

Some embodiments provide a negative active material for a rechargeable lithium battery comprising an entangled carbon nanofiber structure including a composite particle which in turn is composed of a silicon particle and a carbon coating layer coated on the surface of the silicon particle, and a porous space formed by the entangled carbon nanofibers, wherein the composite particle contacts the external surface of the carbon nanofibers in the porous space and the carbon nanofiber has a diameter ranging from about 100 nm to about 2000 nm and a larger diameter than that of the composite particle.

In some embodiments, the instant carbon nanofiber may have about 2 times to about 200 times a larger diameter than that of the composite particle.

In some embodiments, the diameter of the instant silicon particle may range from about 5 nm to about 300 nm.

In some embodiments, the porous space may have a diameter ranging from about 2 nm to about 100 nm.

In some embodiments, the carbon coating layer may include natural graphite, artificial graphite, soft carbon, hard carbon, ketjen black, carbon black, or a combination thereof.

In some embodiments, the silicon particle may be included in an amount of about 1 part to about 25 parts by weight based on 100 parts by weight of the carbon nanofiber.

In some embodiments, the amount of the composite particle may range from about 3 wt % to about 100 wt % based on the total amount of the negative active material.

In some embodiments, the amount of the carbon nanofiber may range from about 2 wt % to about 75 wt % based on the total amount of the negative active material.

Other embodiments provide a method of preparing the negative active material for a rechargeable lithium battery that includes mixing polyacrylonitrile, 1-methoxy-2-propanol acetate, and a silicon particle to prepare a polymer solution, electrospinning the polymer solution at about 5 kV to about 20 kV to prepare a carbon nanofiber structure including the silicon particle dispersed therein, and carbonizing the carbon nanofiber structure including the silicon particle dispersed therein.

In some embodiments, the weight average molecular weight (Mw) of the polyacrylonitrile may range from about 10000 g/mol to about 50000 g/mol.

In some embodiments, the polymer solution may include the polyacrylonitrile, the 1-methoxy-2-propanol acetate and the silicon particle at weight ratios of about 40 to 70:about 10 to 35:about 1 to 25.

In some embodiments, the carbonizing process may be performed at a temperature ranging from about 500° C. to about 1500° C.

In some embodiments between the electrospinning and the carbonizing processes, stabilization of the carbon nanofiber structure and the silicon particle may be further included.

In some embodiments, the stabilization may be performed at a temperature ranging from about 200° C. to about 1000° C.

Further aspects provide a rechargeable lithium battery with a negative electrode including a negative active material, a positive electrode including a positive active material, and an electrolyte.

Other embodiments may provide a negative active material for a high-capacity rechargeable lithium battery, a method of preparing the same, and a rechargeable lithium battery having improved initial efficiency and cycle-life characteristic.

Another embodiment provides a rechargeable lithium battery as disclosed and described herein, wherein the carbon nanofiber of the negative active material has about 2 times to about 200 times a larger diameter than that of the composite particle.

Another embodiment provides a rechargeable lithium battery as disclosed and described herein, wherein a diameter of the silicon particle of the negative active material ranges from about 5 nm to about 300 nm.

Another embodiment provides a rechargeable lithium battery as disclosed and described herein, wherein the porous space has a diameter ranging from about 5 nm to about 500 nm.

Another embodiment provides a rechargeable lithium battery as disclosed and described herein, wherein the carbon coating layer of the negative active material comprises natural graphite, artificial graphite, soft carbon, hard carbon, ketjen black, carbon black, or a combination thereof.

Another embodiment provides a rechargeable lithium battery as disclosed and described herein, wherein the silicon particle of the negative active material is included in an amount of about 1 part to about 25 parts by weight based on 100 parts by weight of the carbon nanofiber.

Another embodiment provides a rechargeable lithium battery as disclosed and described herein, wherein an amount of the composite particle of the negative active material ranges from about 25 wt % to about 98 wt % based on the total amount of negative active material.

Another embodiment provides a rechargeable lithium battery as disclosed and described herein, wherein an amount of the carbon nanofiber of the negative active material ranges from about 2 wt % to about 75 wt % based on the total amount of the negative active material.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description" one will understand how illustrated features serve to explain certain principles of the present disclosure.

DETAILED DESCRIPTION

Figure 1:
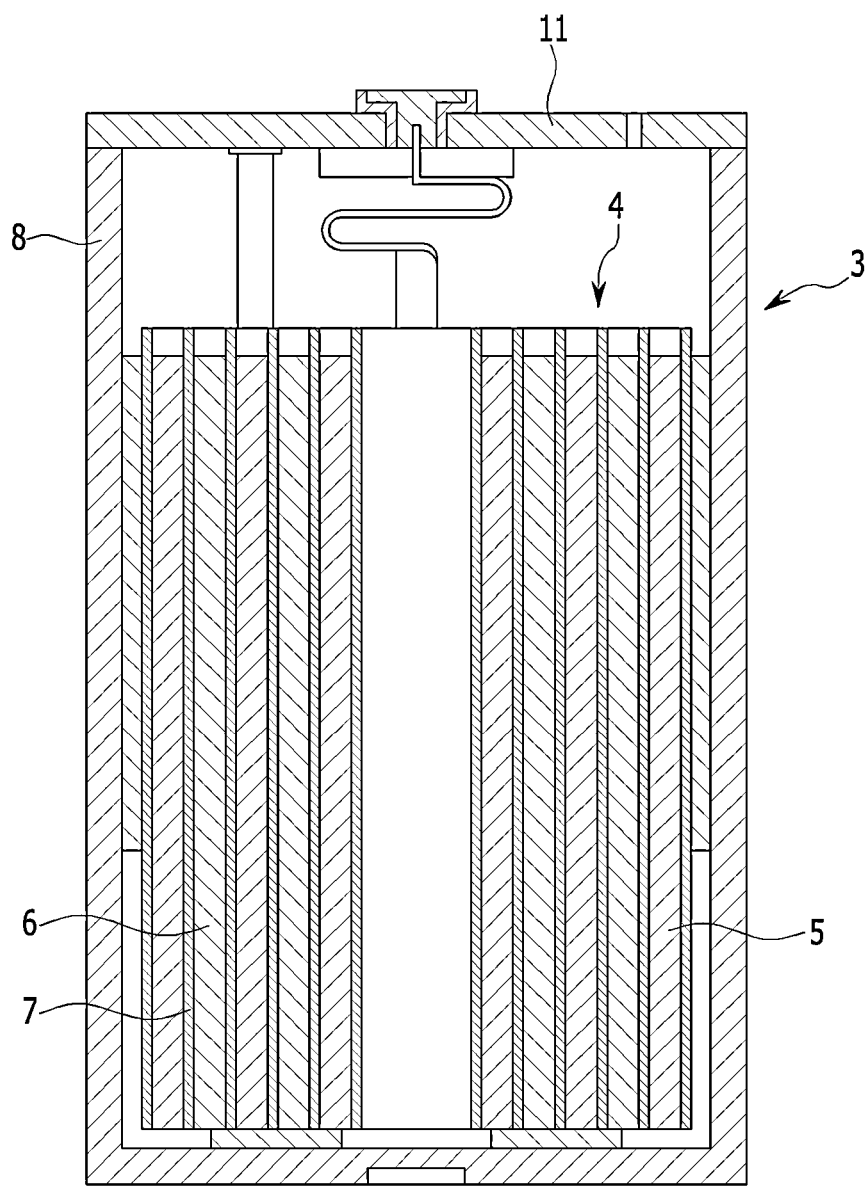
FIG. 1 is an exploded perspective view of a rechargeable lithium battery according to one embodiment.
Figure 2:
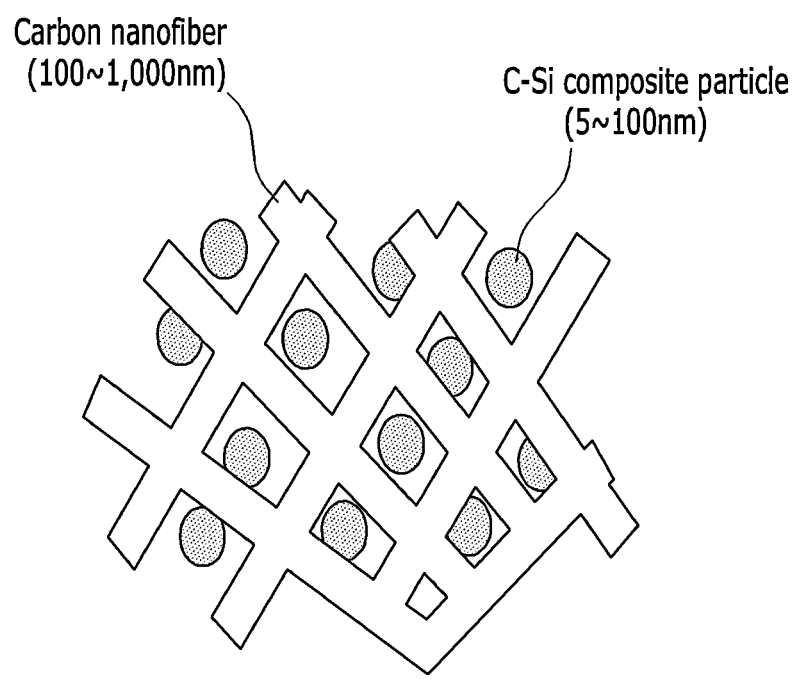
FIG. 2 is a schematic view showing negative active materials according to Examples 1 to 5.

Exemplary embodiments will hereinafter be described in detail. However, these embodiments are exemplary, and this disclosure is not limited thereto.

According to one embodiment, a negative active material for a rechargeable lithium battery includes a carbon nanofiber structure including a composite particle including a silicon particle and a carbon coating layer coated on the surface of the silicon particle and a porous space formed by the entangled carbon nanofibers, wherein the composite particle contacts the external surface of the carbon nanofiber in the porous space of the carbon nanofiber structure, and the carbon nanofiber has a diameter ranging from about 100 nm to about 2000 nm and a larger diameter than that of the composite particle.

In general, since a metal-based active material has greater than or equal to about ten times higher capacity than a carbon-based active material, a rechargeable lithium battery including the composite particle as an active material may have higher capacity than a rechargeable lithium battery including only the carbon-based active material. In particular, the carbon coating layer is coated on the surface of the silicon particle and may suppress a separation from a current collector due to volume expansion of the silicon particle during the charge and discharge.

In some embodiments, the carbon nanofiber structure includes a porous space formed by the entangled carbon nanofibers, and the porous space indicates a state that the carbon nanofibers are entangled and entwined, that is, a space formed when a plurality of the carbon nanofibers are horizontally and vertically positioned and interlaced.

In some embodiments, the composite particle contact the carbon nanofibers in the porous space formed by the entangled carbon nanofibers.

In some embodiments, the composite particle may be present in an inner space of the carbon nanofibers.

The instant carbon nanofiber may have a diameter ranging from about 100 nm to about 2000 nm, specifically, about 100 nm to about 1000 nm and about 10 times to about 200 times, and more specifically, about 10 times to about 100 times larger diameter than that of the composite particle. In this way, the carbon nanofiber has a larger diameter than that of the composite particle and thus, may be much less prone to separation from a current collector due to volume expansion of the silicon particle during the charge and discharge.

The instant composite particle contacts the external surface of the carbon nanofibers of the carbon nanofiber structure in the porous space and thus may easily control volume expansion of the silicon particle generated during the charge and discharge cycle of a rechargeable lithium battery. Herein, the instant silicon particle may have a diameter ranging from about 5 nm to about 300 nm and specifically, about 5 nm to about 100 nm. The porous space may have a diameter ranging from about 2 nm to about 500 nm and about 5 nm to about 500 nm. In one embodiment, the porous space may have a diameter ranging from about 2 nm to about 100 nm. This diameter range of the silicon particle is optimal to control volume expansion of the silicon particle during the charge and discharge of a rechargeable lithium battery, which leads to the best use of mechanical/physical characteristics of the carbon nanofiber and the improvement of cycle-life characteristics of a rechargeable lithium battery.

In some embodiments, the carbon coating layer may be formed through carbonization. Specifically, the carbon coating layer may include natural graphite, artificial graphite, soft carbon, hard carbon, ketjen black, carbon black, or a combination thereof, and more specifically a graphite-based material of natural graphite, artificial graphite, or a combination thereof.

In some embodiments, the silicon particle may be included in an amount of about 1 part to about 25 parts by weight, and specifically from about 1 part to about 10 parts by weight based on 100 parts by weight of the carbon nanofiber. When the silicon particle is included within the ratio range, volume expansion of the silicon particle may be minimized.

In some aspects, an amount of the composite particle may range from about 25 wt % to about 98 wt %, and specifically about 30 wt % to about 95 wt % based on the total amount of the negative active material, and an amount of the carbon nanofiber may range from about 2 wt % to about 75 wt %, and specifically about from 5 wt % to about 70 wt % based on the total amount of the negative active material. When the composite particle and the carbon nanofiber are included within this range, volume expansion of the silicon particle may be optimally controlled and high-capacity of a rechargeable lithium battery may also be maintained.

According to another embodiment, a method of preparing the negative active material for a rechargeable lithium battery is provided which may include preparing a polymer solution by mixing polyacrylonitrile, 1-methoxy-2-propanol acetate, and a silicon particle; preparing a carbon nanofiber precursor including the silicon particle dispersed therein by electrospinning the polymer solution at about 5 kV to about 20 kV; and carbonizing the carbon nanofiber structure including the silicon particle dispersed therein.

In the preparation of the polymer solution, the polyacrylonitrile may have a weight average molecular weight ranging from about 10000 g/mol to about 50000 g/mol and specifically, about 15000 g/mol to about 45000 g/mol. The polymer solution may be prepared by mixing the polyacrylonitrile, the 1-methoxy-2-propanol acetate, and the silicon particle in a weight ratio of respectively from about 40 to about 70:from about 10 to about 35:from about 1 to about 25 and specifically, from about 55 to about 70:from about 20 to about 35:from about 1 to about 10. When the mixing ratio is within the range, the polyacrylonitrile, the 1-methoxy-2-propanol acetate, and the silicon particle may be uniformly dispersed in the polymer solution.

In other aspects, in the electrospinning and spraying process steps, the electrospinning may be performed at about 5 kV to about 20 kV. When the electrospinning is performed within the range, the carbon nanofiber may have a diameter ranging from about 100 nm to about 2000 nm, and the silicon particle with a diameter ranging from about 10 nm to about 300 nm along with the carbon nanofiber may be sprayed.

In some aspects, in the carbonizing process, the heat treatment may be performed at a temperature ranging from about 500° C. to about 1500° C. and specifically, from about 600° C. to about 900° C. When the heat treatment is performed within this temperature range, the carbonizing process may effectively proceed through formation of the carbon nanofiber structure including a porous space and carbon-coating of the silicon particle. In the carbonizing process, the heat treatment may be performed under a nitrogen atmosphere, argon atmosphere, or etc.

Between the instant electrospinning and the carbonizing processes, stabilization of the carbon nanofiber structure including the silicon particle dispersed therein may be further performed at a temperature ranging from about 200° C. to about 1000° C. and specifically, from about 500° C. to about 900° C. The heat treatment within the temperature range may bring about effective carbonization.

According to another embodiment, a rechargeable lithium battery including the negative electrode including a negative active material, a positive electrode including a positive active material, and an electrolyte is provided. Optionally, a separator between the positive electrode and the negative electrode may be present.

Rechargeable lithium batteries may be classified as lithium ion batteries, lithium ion polymer batteries, and lithium polymer batteries according to the presence of a separator and the kind of electrolyte used in the battery. The rechargeable lithium batteries may also be classified as cylindrical, prismatic, coin-type, or pouch-type batteries according to shapes, and may be classified as thin film or bulk batteries. Structures and manufacturing methods for lithium ion batteries pertaining to this disclosure are well known in the art.

FIG. 1 is a schematic view showing a rechargeable lithium battery according to one embodiment.

Referring to FIG. 1, a rechargeable lithium battery 3 according to one embodiment is a prismatic type battery that includes an electrode assembly 4 including a positive electrode 5, a negative electrode 6, and a separator 7 disposed between the positive electrode 5 and negative electrode 6 in a battery case 8, an electrolyte injected through the upper side of the battery case 8, and a cap plate 11 sealing the battery case 8. The rechargeable lithium battery according to certain embodiments is not limited to a prismatic type of rechargeable lithium battery, and it may be formed in diverse forms such as a cylindrical form, a coin-type form, or a pouch form as long as it includes the negative active material for a rechargeable lithium battery according to one embodiment and operates as a battery.

In some aspects, the negative electrode includes a current collector and a negative active material layer formed on the current collector, and the negative active material layer includes a negative active material.

The negative active material is the same as described above.

The instant negative active material layer includes a binder and optionally, a conductive material.

The binder improves binding properties of negative active material particles with one another and with a current collector. In some embodiments, the binder may include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode. Any electrically conductive material may be used as a conductive material, unless it causes a chemical change. In some embodiments, examples of the conductive material may be carbon-based material such as natural graphite, artificial graphite, carbon black, acetylene black, ketjen black, a carbon fiber and the like; copper, nickel, aluminum, silver, and the like; a metal-based material of a metal powder or metal fiber and the like; a conductive polymer such as a polyphenylene derivative and the like; or mixtures thereof.

In some embodiments, the current collector may include a copper foil, a nickel foil, a stainless steel foil, a titanium foil, a nickel foam, a copper foam, a polymer substrate coated with a conductive metal, or a combination thereof.

In some embodiments the positive electrode may include a positive current collector and a positive active material layer formed on the positive current collector.

In some embodiments, positive active material may include lithiated intercalation compounds that reversibly intercalate and deintercalate lithium ions. Specifically, at least one composite oxide of lithium and a metal of cobalt, manganese, nickel, or a combination thereof may be used, and specific examples thereof may be a compound represented by one of the following chemical formulae:

$Li_aA_{1-b}R_bD^1_2$ (0.90≤a≤1.8 and 0≤b≤0.5);

$Li_aE_{1-b}R_bO_{2-c}D^1_c$ (0.90≤a≤1.8, 0≤b≤0.5 and 0≤c≤0.05);

$LiE_{2-b}R_bO_{4-c}D^1_c$ (0≤b≤0.5, 0≤c≤0.05);

$Li_aNi_{1-b-c}Co_bR_cD^1_\alpha$ (0.90≤a≤1.8, 0≤b≤0.5, 0≤c≤0.05 and 0≤α≤2);

$Li_aNi_{1-b-c}Co_bR_cO_{2-\alpha}Z_\alpha$ (0.90≤a≤1.8, 0≤b≤0.5, 0≤c≤0.05 and 0≤α≤2);

$Li_aNi_{1-b-c}Co_bR_cO_{2-\alpha}Z_2$ (0.90≤a≤1.8, 0≤b≤0.5, 0≤c≤0.05 and 0≤α≤2);

$Li_aNi_{1-b-c}Mn_bR_cD^1_\alpha$ (0.90≤a≤1.8, 0≤b≤0.5, 0≤c≤0.05 and 0≤α≤2);

$Li_aNi_{1-b-c}Mn_bR_cO_{2-\alpha}Z_\alpha$ (0.90≤a≤1.8, 0≤b≤0.5, 0≤c≤0.05 and 0≤α≤2);

$Li_aNi_{1-b-c}Mn_bR_cO_{2-\alpha}Z_2$ (0.90≤a≤1.8, 0≤b≤0.5, 0≤c≤0.05 and 0≤α≤2);

$Li_aNi_bE_cG_dO_2$ (0.90≤a≤1.8, 0≤b≤0.9, 0≤c≤0.5 and 0.001≤d≤0.1);

$Li_aNi_bCo_cMn_dGeO_2$ (0.90≤a≤1.8, 0≤b≤0.9, 0≤c≤0.5, 0≤d≤0.5 and 0.001≤e≤0.1);

$Li_aNiG_bO_2$ (0.90≤a≤1.8 and 0.001≤b≤0.1);

$Li_aCoG_bO_2$ (0.90≤a≤1.8 and 0.001≤b≤0.1);

$Li_aMnG_bO_2$ (0.90≤a≤1.8 and 0.001≤b≤0.1);

$Li_aMn_2G_bO_4$ (0.90≤a≤1.8 and 0.001≤b≤0.1); $QO_2$; $QS_2$; $LiQS_2$; $V_2O_5$; $LiV_2O_5$; $LiTO_2$;

$LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above Chemical Formulae, A is Ni, Co, Mn, or a combination thereof; R is Al, Ni, Co, Mn, Cr, Fe, Mg, Sr, V, a rare earth element, or a combination thereof; $D^1$ is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

In some embodiments, instant positive active material may include the positive active material with the coating layer, or a compound of the active material and the active material coated with the coating layer. The coating layer may include a coating element compound of an oxide of a coating element, hydroxide of a coating element, oxyhydroxide of a coating element, oxycarbonate of a coating element, or hydroxycarbonate of a coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any conventional processes as long as it does not causes any side effects on the properties of the positive active material (e.g., spray coating, immersing), which is well known to persons having ordinary skill in this art, so a detailed description thereof is omitted.

In some embodiments, the positive active material layer includes a binder and a conductive material.

The binder improves binding properties of positive active material particles with one another and with a current collector. In some embodiments, examples thereof may be polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode. Any electrically conductive material may be used as a conductive material, unless it causes a chemical change. In some embodiments, examples thereof may be one or more of natural graphite, artificial graphite, carbon black, acetylene black, ketjen black, carbon fiber, copper, nickel, aluminum, silver, and the like, a metal powder, a metal fiber, and the like, a conductive material such as a polyphenylene derivative and the like.

In some embodiments, the current collector may include Al, but is not limited thereto.

The negative electrode and the positive electrode may be manufactured by mixing an active material, a conductive material, and a binder in a solvent to prepare an active material composition, and coating the composition on a current collector. The electrode manufacturing method is well known, and thus is not described in detail in the present specification. In some embodiments, the solvent includes N-methylpyrrolidone and the like, but is not limited thereto.

In some embodiments, the electrolyte includes a non-aqueous organic solvent and a lithium salt.

The non-aqueous organic solvent serves as a medium for transmitting ions taking part in the electrochemical reaction of a battery.

In some embodiments, the non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like, and the ketone-based solvent may include cyclohexanone, and the like. The alcohol-based solvent may include ethanol, isopropyl alcohol, and the like, and the aprotic solvent may include nitriles such as R—CN(R is a hydrocarbon group having a C2 to C20 linear, branched, or cyclic structure, and may include a double bond, an aromatic ring, or an ether bond) and the like, amides such as dimethylformamide and the like, dioxolanes such as 1,3-dioxolane and the like, sulfolanes, and the like.

The non-aqueous organic solvent may be used singularly or in a mixture. When the organic solvent is used in a mixture, the mixture ratio can be controlled in accordance with a desirable battery performance.

The carbonate-based solvent is prepared by mixing a cyclic carbonate and a linear carbonate. The cyclic carbonate and the linear carbonate are mixed together in the volume ratio of about 1:1 to about 1:9. Within this range, performance of electrolyte may be improved.

In some embodiments, the non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

In some embodiments, the aromatic hydrocarbon-based organic solvent may be an aromatic hydrocarbon-based compound represented by the following Chemical Formula 1.

Chemical Formula 1

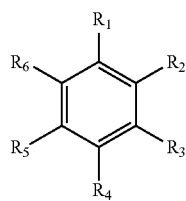

In the in the above Chemical Formula 1, $R_1$ to $R_6$ are each independently hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In order to improve the instant battery cycle-life, in some embodiments, the non-aqueous electrolyte may further include vinylene carbonate or an ethylene carbonate-based compound of the following Chemical Formula 2.

Chemical Formula 2

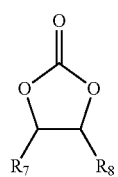

In the above Chemical Formula 2, $R_7$ and $R_8$ are each independently hydrogen, a halogen, a cyano group (CN), a nitro group ($NO_2$), or a C1 to C5 fluoroalkyl group, wherein at least one of the $R_7$ and $R_8$ is a halogen, a cyano group (CN), a nitro group ($NO_2$), or a C1 to C5 fluoroalkyl group.

Examples of the instant ethylene carbonate-based compound are difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

In some embodiments, the lithium salt is dissolved in an organic solvent, supplies lithium ions in a battery, operates a basic operation of the rechargeable lithium battery, and improves lithium ion transportation between positive and negative electrodes therein. Examples of the lithium salt may be $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$ (lithium bis(oxalato) borate; LiBOB) or a combination thereof, which is used as a supporting electrolytic salt. The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The separator 7 may include anything commonly used in a lithium battery as long as separating a negative electrode 6 from a positive electrode 5 and providing a transporting passage of lithium ion. In other words, it may have a low resistance to ion transport and an excellent impregnation for electrolyte. For example, it may be selected from a glass fiber, polyester, polyethylene, polypropylene, polytetrafluoroethylene (PTFE), or a combination thereof. It may have a form of a non-woven fabric or a woven fabric. For example, for the lithium ion battery, polyolefin-based polymer separator such as polyethylene, polypropylene or the like is mainly used. In order to ensure the heat resistance or mechanical strength, a coated separator including a ceramic component or a polymer material may be used. Selectively, it may have a mono-layered or multi-layered structure.

Hereinafter an examples of the present embodiments and comparative examples are described. These examples, however, should not in any sense be interpreted as limiting the scope of the present embodiments.

Example 1

Preparation of Negative Active Material for Rechargeable Lithium Battery

Polyacrylonitrile (molecular average molecular weight: about 20,000 g/mol), 1-methoxy-2-propanol acetate, and silicon particles were respectively mixed in a weight ratio of 59:33:8, preparing a mixed solution.

The mixed solution was electrospinned at 20 kV to prepare a carbon nanofiber structure. The carbon nanofiber structure and the dispersed silicon particles were heat-treated at 500° C. Then, the heat-treated resultant was heat-treated at 700° C. under a nitrogen atmosphere, preparing a negative active material.

Manufacture of Negative Electrode 90 wt % of the negative active material was mixed with 10 wt % of a polytetrafluoroethylene binder in an N-methylpyrrolidone solvent, preparing negative active material slurry. The prepared negative active material slurry was coated on a 10 μm-thick copper foil in a doctor blade method, dried at 100° C. for 24 hours under a vacuum atmosphere, manufacturing a coin-typed negative electrode stacked with an 80 μm-thick negative active material layer.

Example 2

A negative electrode was manufactured according to the same method as Example 1 except for performing the electrospinning at 15 kV.

Example 3

A negative electrode was manufactured according to the same method as Example 1 except for performing the electrospinning at 5 kV.

Evaluation 1

Diameter Measurement of Carbon Nanofiber

SEM photographs of the negative electrodes taken by using SEM (Magellan 400, FEI).

Figure 3:
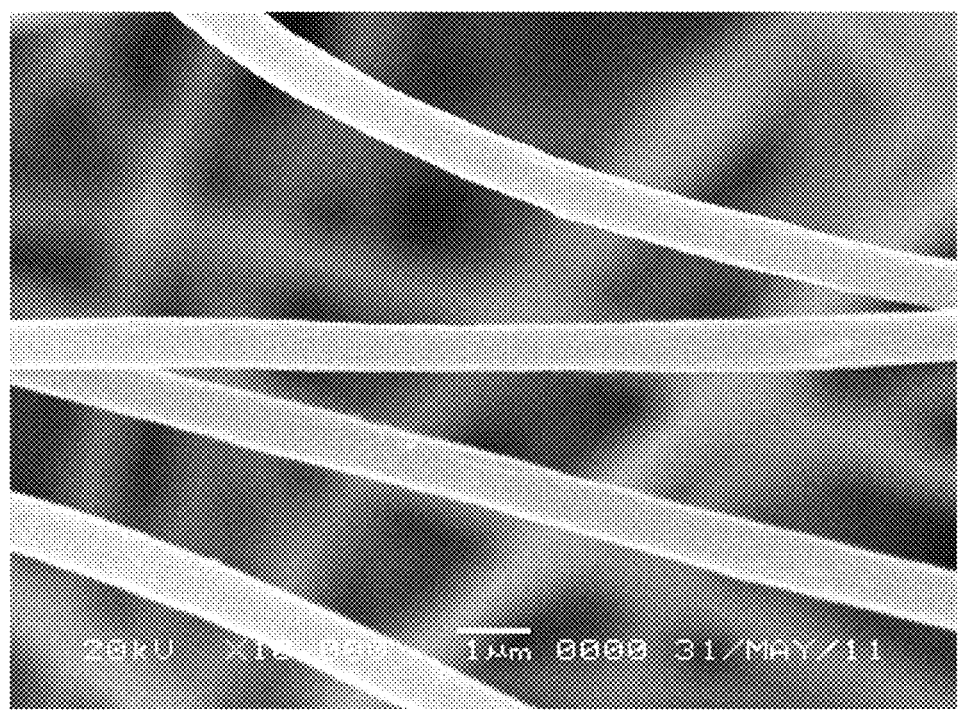
FIG. 3 is a SEM photograph showing the negative active material according to Example 1.

FIG. 3 is a SEM photograph showing the negative active material according to Example 1.

Figure 4:
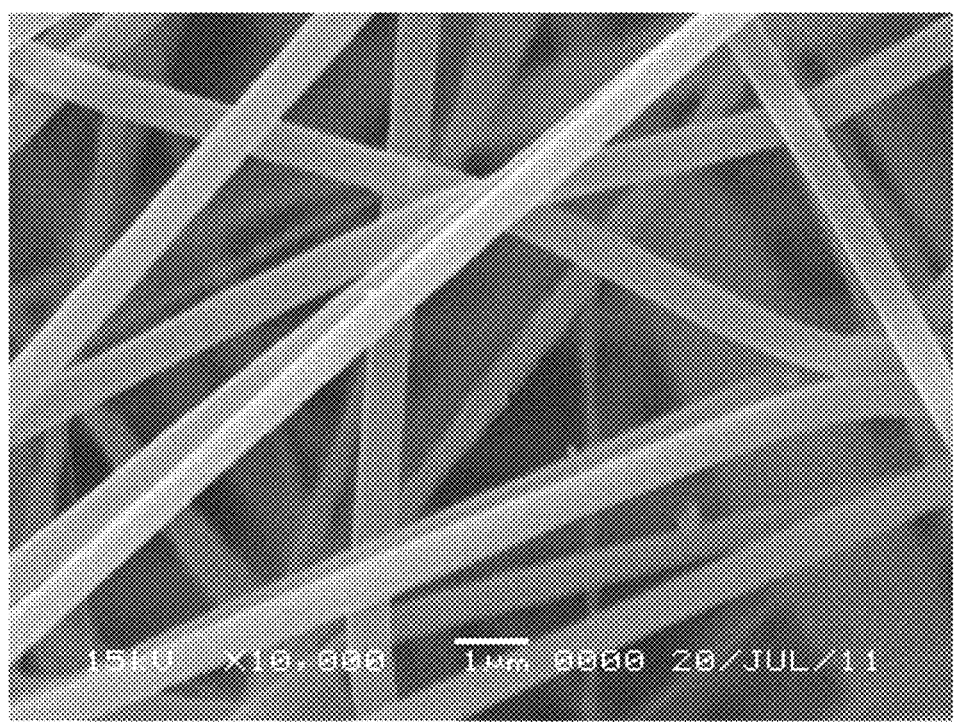
FIG. 4 is a SEM photograph showing the negative active material according to Example 2.

FIG. 4 is a SEM photograph showing the negative active material according to Example 2.

Figure 5:
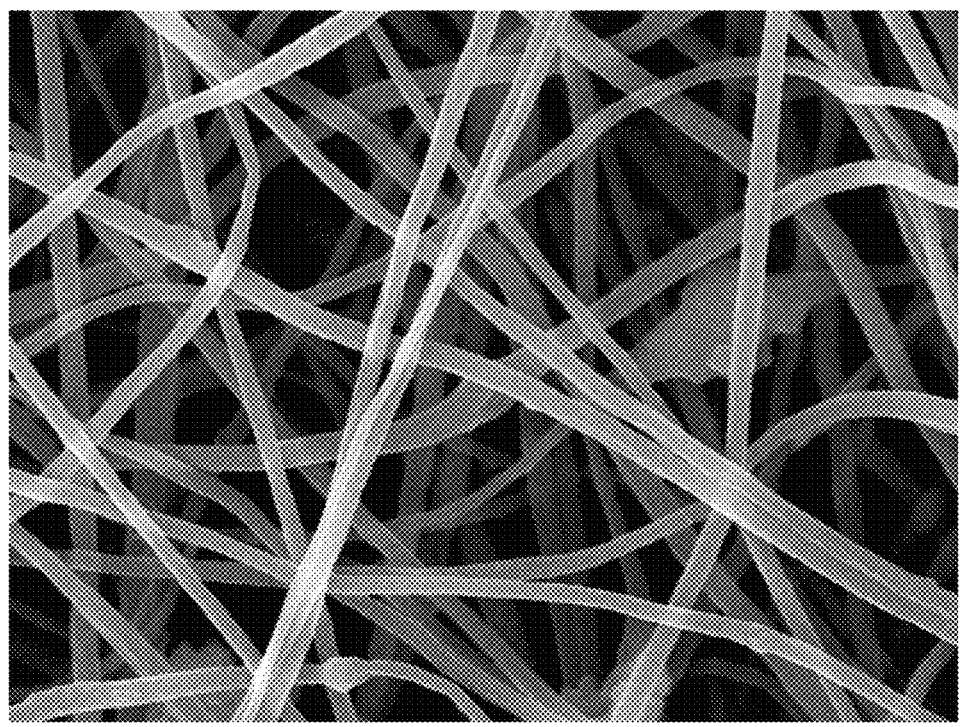
FIG. 5 is a SEM photograph showing the negative active material according to Example 3.

FIG. 5 is a SEM photograph showing the negative active material according to Example 3.

FIGS. 3 to 5, the carbon nanofibers had a diameter of respectively 100 nm, 150 nm, and 500 nm.

Evaluation 2

Amount of Silicon Particle in Negative Active Material

Figure 6:
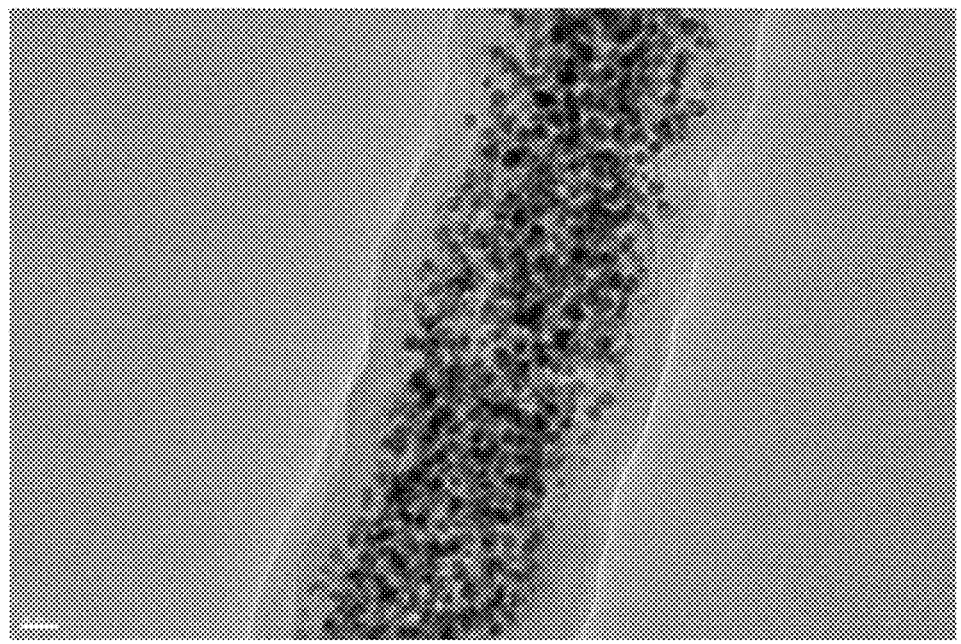
FIG. 6 is a TEM photograph showing the negative active material according to Example 1.
Figure 7:
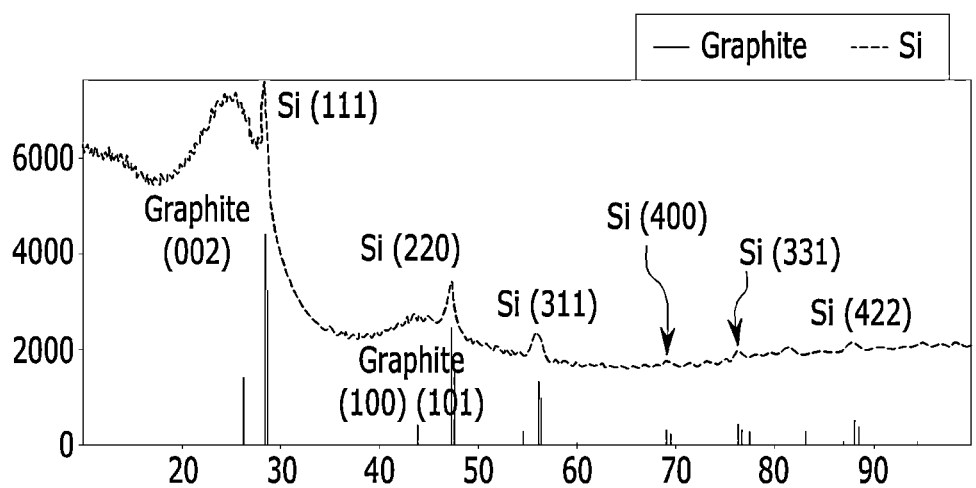
FIG. 7 is a graph showing XRD analysis results of carbon nanofibers according to Examples 1 to 3.

FIG. 6 is a graph showing TEM photograph of the negative active materials according to Example 1.

Referring to FIG. 6, silicon and graphite were all found in the negative active materials according to Example 1.

In the following Tables 1 to 3, the specific amounts of silicon and graphite in the carbon nanofiber structures through a stabilization step according to Examples 1 to 3 were ICP-analyzed.

TABLE 1

| ICP analysis of Example 1 | | |
|---|---|---|
| Kind of element | Element (%) | Atom (%) |
| C | 94.62 | 97.62 |
| Si | 5.38 | 2.38 |
| Sum | 100 | 100 |

TABLE 2

| ICP analysis of Example 2 | | |
|---|---|---|
| Kind of element | Element (%) | Atom (%) |
| C | 74.54 | 83.91 |
| O | 10.54 | 8.91 |
| Si | 14.92 | 7.18 |
| Sum | 100 | 100 |

TABLE 3

| ICP analysis of Example 3 | | |
|---|---|---|
| Kind of element | Element (%) | Atom (%) |
| C | 83.96 | 92.45 |
| Si | 16.04 | 7.55 |
| Sum | 100 | 100 |

Evaluation 3

Charge/Discharge Characteristic Evaluation of Rechargeable Lithium Battery Cell

Figure 8:
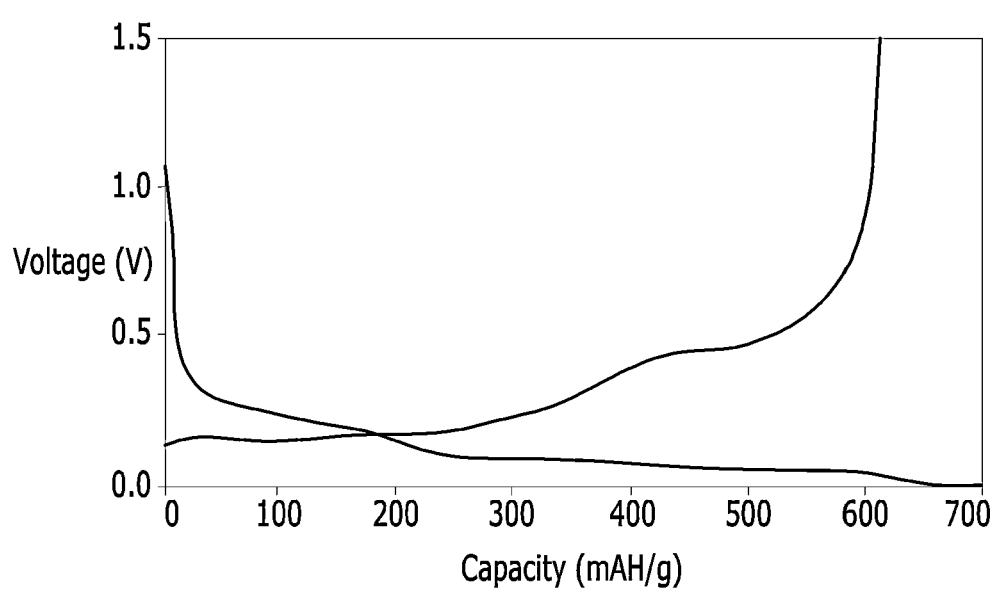
FIG. 8 is a graph showing the charge and discharge capacity characteristics of a rechargeable lithium battery according to Example 2.

The rechargeable lithium battery cell according to Example 1 was charged and discharged under the following condition, its high-rate charge and discharge characteristic was evaluated, and the result was provided in following FIG. 8.

The high-rate charge and discharge characteristic evaluation was performed by 1 cycle charging/discharging of the rechargeable lithium battery cell at a respective current of 0.2 C and 0.2 C. Herein, a charge cut-off voltage was 1.5V, and a discharge cut-off voltage was 0.1V.

FIG. 8 shows charge/discharge capacity of the rechargeable lithium battery cell according to Example 1.

Referring to FIG. 8, the rechargeable lithium battery cell according to Example 1 had charge/discharge capacity of greater than or equal to 600 mAh/g and thus, had excellent high-rate charge and discharge characteristic.

While this invention has been described in connection with what are presently considered to be practical exemplary embodiments, it will be appreciated by those skilled in the art that various modifications and changes may be made without departing from the scope of the present disclosure. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the embodiments are not limited to the disclosed embodiments, but, on the contrary, is intended to cover various modifications and equivalent arrangements included within the spirit and scope of the appended claims.

What is claimed is:

1. A negative active material for a rechargeable lithium battery, comprising:
    a composite particle comprising a silicon particle and a carbon coating layer coated on the surface of the silicon particle; and
    a carbon nanofiber structure comprising a porous space formed by entangled carbon nanofibers,
    wherein the composite particle contacts the external surface of the carbon nanofibers in the porous space of the carbon nanofiber structure, and the carbon nanofiber has a diameter ranging from about 100 nm to about 2000 nm and a larger diameter than that of the composite particle.

2. The negative active material of claim 1, wherein the carbon nanofiber has a diameter that is about 2 times to about 200 times larger than that of the composite particle.

3. The negative active material of claim 1, wherein a diameter of the silicon particle ranges from about 5 nm to about 300 nm.

4. The negative active material of claim 1, wherein the porous space has a diameter ranging from about 5 nm to about 500 nm.

5. The negative active material of claim 1, wherein the silicon particle is included in an amount of about 1 part to about 25 parts by weight based on 100 parts by weight of the carbon nanofiber.

6. The negative active material of claim 1, wherein an amount of the composite particle ranges from about 25 wt % to about 98 wt % based on the total amount of the negative active material.

7. The negative active material of claim 1, wherein an amount of the carbon nanofiber ranges from about 2 wt % to about 75 wt % based on the total amount of the negative active material.

8. The negative active material of claim 1, wherein the composite particle is present in an inner space of the carbon nanofibers.

9. A rechargeable lithium battery, comprising:
a negative electrode including a negative active material comprising a composite particle comprising a silicon particle and a carbon coating layer coated on the surface of the silicon particle; and a carbon nanofiber structure comprising a porous space formed by entangled carbon nanofibers, wherein the composite particle contacts the external surface of the carbon nanofibers in the porous space of the carbon nanofiber structure, and the carbon nanofiber has a diameter ranging from about 100 nm to about 2000 nm and a larger diameter than that of the composite particle;
a positive electrode including a positive active material; and
an electrolyte.

10. The rechargeable lithium battery of claim 9, wherein the carbon nanofiber of the negative active material has about 2 times to about 200 times a larger diameter than that of the composite particle.

11. The rechargeable lithium battery of claim 9, wherein a diameter of the silicon particle of the negative active material ranges from about 5 nm to about 300 nm.

12. The rechargeable lithium battery of claim 9, wherein the porous space has a diameter ranging from about 5 nm to about 500 nm.

13. The rechargeable lithium battery of claim 9, wherein the silicon particle of the negative active material is included in an amount of about 1 part to about 25 parts by weight based on 100 parts by weight of the carbon nanofiber.

14. The rechargeable lithium battery of claim 9, wherein an amount of the composite particle of the negative active material ranges from about 25 wt % to about 98 wt % based on the total amount of negative active material.

15. The rechargeable lithium battery of claim 9, wherein an amount of the carbon nanofiber of the negative active material ranges from about 2 wt % to about 75 wt % based on the total amount of the negative active material.

* * * * *